US009448085B2

(12) United States Patent
Bass et al.

(10) Patent No.: US 9,448,085 B2
(45) Date of Patent: Sep. 20, 2016

(54) LIVE BRANDED DYNAMIC MAPPING

(71) Applicant: Blazer and Flip Flops, Inc., San Diego, CA (US)

(72) Inventors: Joshua David Bass, Carlsbad, CA (US); Benjamin Harry Ziskind, San Diego, CA (US); Scott Sebastian Sahadi, Solana Beach, CA (US)

(73) Assignee: Blazer and Flip Flops, Inc., San Diego, CA (US)

( * ) Notice: Subject to any disclaimer, the term of this patent is extended or adjusted under 35 U.S.C. 154(b) by 0 days.

(21) Appl. No.: 14/632,872

(22) Filed: Feb. 26, 2015

(65) Prior Publication Data
US 2015/0241238 A1 Aug. 27, 2015

Related U.S. Application Data

(60) Provisional application No. 61/945,049, filed on Feb. 26, 2014.

(51) Int. Cl.
G01C 21/36 (2006.01)
G06Q 30/02 (2012.01)
G01C 21/34 (2006.01)

(52) U.S. Cl.
CPC ....... *G01C 21/3644* (2013.01); *G01C 21/3492* (2013.01); *G01C 21/367* (2013.01); *G01C 21/3673* (2013.01); *G01C 21/3676* (2013.01); *G06Q 30/0259* (2013.01)

(58) Field of Classification Search
CPC .......... G01C 21/3644; G01C 21/3492; G01C 21/367; G01C 21/3673; G01C 21/3676; G06Q 30/0259
See application file for complete search history.

(56) References Cited

U.S. PATENT DOCUMENTS 5,978,744 A * 11/1999 McBride ............ G01S 5/02 33/320
6,142,368 A 11/2000 Mullins et al.
(Continued)

FOREIGN PATENT DOCUMENTS

WO WO 2011/159811 12/2011
WO WO 2013/163444 10/2013
(Continued)

OTHER PUBLICATIONS

Feng et al., Yue ; "Effective venue image retrieval using robust feature extraction and model constrained matching for mobile robot localization", Machine Vision and Applications, DOI 10.1007/s00138-011-0350-z, Oct. 28, 2010.
(Continued)

Primary Examiner — Calvin Cheung
(74) Attorney, Agent, or Firm — Polsinelli LLP

(57) ABSTRACT

A live dynamic map that provides for increased convenience for a user at a venue is disclosed. The live dynamic map may be branded for a venue, shows points of interest and paths between locations, includes a messaging capability, and allows users to be social with one another as well as venue management. Live branded mapping may allow for similar engagement on a region-by-region, neighborhood-by-neighborhood, or even brand-by-brand basis. By engaging on a hyper-local level, the present mapping platform can better target user and payload delivering and improve upon business to consumer brand engagement.

19 Claims, 3 Drawing Sheets

200

— 280 (Personalization)
— 270 (Monetization)
— 260 (Analytics)
— 250 (Social)
— 240 (Messaging)
— 230 (Way Finding)
— 220 (Points of Interest)
— 210 (Branded Layer)

(56) References Cited

U.S. PATENT DOCUMENTS

| | | | |
|---|---|---|---|
| 6,320,496 B1* | 11/2001 | Sokoler | G01C 21/20 340/407.1 |
| 6,352,205 B1 | 3/2002 | Mullins et al. | |
| 6,414,635 B1 | 7/2002 | Stewart et al. | |
| 6,474,557 B2 | 11/2002 | Mullins et al. | |
| 6,493,630 B2 | 12/2002 | Ruiz et al. | |
| 6,663,006 B2 | 12/2003 | Mullins et al. | |
| 6,687,608 B2 | 2/2004 | Sugimoto et al. | |
| 6,997,380 B2 | 2/2006 | Safael et al. | |
| 7,222,080 B2* | 5/2007 | Hale | G06Q 10/02 340/4.6 |
| 2003/0007464 A1* | 1/2003 | Balani | G06Q 30/0601 370/310 |
| 2004/0224703 A1* | 11/2004 | Takaki | H04W 4/02 455/457 |
| 2007/0174115 A1 | 7/2007 | Chieu et al. | |
| 2008/0183582 A1* | 7/2008 | Major | G06Q 30/0277 705/14.73 |
| 2008/0186164 A1* | 8/2008 | Emigh | B60R 25/1004 340/539.13 |
| 2010/0042320 A1 | 2/2010 | Salmre et al. | |
| 2010/0194784 A1* | 8/2010 | Hoff | G06F 3/0488 345/661 |
| 2011/0090123 A1* | 4/2011 | Sridhara | G01S 5/0252 342/450 |
| 2011/0173545 A1 | 7/2011 | Meola | |
| 2011/0221745 A1* | 9/2011 | Goldman | G06Q 30/02 345/419 |
| 2011/0246148 A1* | 10/2011 | Gupta | H04W 64/00 703/2 |
| 2011/0267369 A1 | 11/2011 | Olsen et al. | |
| 2012/0214515 A1* | 8/2012 | Davis | H04W 4/023 455/456.3 |
| 2012/0239504 A1 | 9/2012 | Curlander et al. | |
| 2012/0270573 A1* | 10/2012 | Marti | G01C 21/206 455/457 |
| 2012/0274642 A1* | 11/2012 | Ofek | G06T 17/05 345/441 |
| 2012/0284117 A1 | 11/2012 | Karandikar | |
| 2013/0024265 A1 | 1/2013 | Lotzof | |
| 2013/0036455 A1 | 2/2013 | Bodi et al. | |
| 2013/0132230 A1 | 5/2013 | Gibson et al. | |
| 2013/0157655 A1 | 6/2013 | Smith et al. | |
| 2013/0158867 A1* | 6/2013 | Sidhu | G01S 19/34 701/472 |
| 2013/0191213 A1 | 7/2013 | Beck et al. | |
| 2013/0317944 A1 | 11/2013 | Huang et al. | |
| 2014/0025466 A1 | 1/2014 | Borton et al. | |
| 2014/0082509 A1 | 3/2014 | Roumeliotis et al. | |
| 2014/0129266 A1* | 5/2014 | Perl | G06Q 30/02 705/5 |
| 2015/0052460 A1* | 2/2015 | Mohammad Mirzaei | G06F 3/0484 715/764 |
| 2015/0222935 A1* | 8/2015 | King | H04N 21/21805 348/48 |
| 2015/0242890 A1 | 8/2015 | Bass | |
| 2015/0244725 A1 | 8/2015 | Ziskind | |

FOREIGN PATENT DOCUMENTS

| | | |
|---|---|---|
| WO | WO 2015/130969 | 9/2015 |
| WO | WO 2015/130971 | 9/2015 |

OTHER PUBLICATIONS

Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (Pacific Vis)*, 2014 IEEE, pp. 193-200.IEEE, 2014.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2015/017827, International Search Report and Written Opinion dated Jun. 11, 2015.
PCT Application No. PCT/US2015/017829, International Search Report and Written Opinion dated Jun. 8, 2015.
U. S. Appl. No. 14/632,884, Joshua D. Bass, Increasing Customer Monetization, filed Feb. 26, 2015.
U. S. Appl. No. 14/633,015, Benjamin H. Ziskind, Venue Notifications, filed Feb. 26, 2015.
U. S. Appl. No. 14/633,019, Benjamin H. Ziskind, Parental Controls, filed Feb. 26, 2015.
U. S. Appl. No. 14/633,019 Office Action mailed May 6, 2016.
U. S. Appl. No. 15/138,157, Scott S. Sahadi, Targeted Venue Message Distribution, filed Apr. 25, 2016.
PCT/US16/29260, Targeted Venue Message Distribution, Apr. 25, 2016.
U. S. Appl. No. 15/144,359, Scott S. Sahadi, Map Based Beacon Management, filed May 2, 2016.
PCT/US16/30424, Map Based Beacon Management, May 2, 2016.
U. S. Appl. No. 15/141,780, Benjamin H. Ziskind, Intelligent Prediction of Queue Wait Times, filed Apr. 28, 2016.
PCT/US16/29880, Intelligent Prediction of Queue Wait Times, Apr. 28, 2016.

* cited by examiner

LIVE BRANDED DYNAMIC MAPPING

CROSS REFERENCE TO RELATED APPLICATIONS

The present application claims the priority benefit of U.S. provisional application No. 61/945,049, filed Feb. 26, 2014, and entitled "System and Method for Live Branded Dynamic Mapping," the disclosure of which is incorporated herein by reference.

BACKGROUND

1. Field of the Invention

The present invention is generally related to web services. More specifically, the present invention relates to live dynamic mapping and branding including hyper-local marketing.

2. Description of the Related Art

Entertainment venues such as theme parks, cruise ships, universities, arenas, resorts, and stadiums are a popular family attractions that host thousands of people. Most venues hosting these events provide static paper maps or signs that allow guests to explore the venue, encourage engagement in one or more activities at the venue, and otherwise attempt to maximize enjoyment while on the premises. The venues often have special events such as concerts, merchandise, culinary, or souvenir sales, and other limited time or new events that are often of interest to their visitors. It is difficult, if not impossible, to track and communicate with visitors concerning these special events when they are only provided with a paper map upon entrance into such an event. Similar challenges exists for visitors to communicate amongst themselves, especially concerning their past, present, and intended future location and plans such as when and where to meet with one another.

There is a need in the art for improved customer communications. Such an improvement is needed such that venues might the overall user experience, better engage with and service customers, track customer needs, and ultimately improve monetization from the user presence at the venue.

SUMMARY OF THE PRESENTLY CLAIMED INVENTION

A first claimed embodiment of the present invention include a method for providing a map on a display. Through this method, a graphical image of a venue map is shown on mobile device. The map includes graphics that are not to scale and have latitude and longitude information associated with multiple points on the map. Visual updates of the user are provided on the map as the user navigates through a venue. Personalized messages are provided to a user based on user data collected while the user is in the venue.

A further embodiment includes a device for providing a map. The device includes a display, memory, and a processor. The processor executes instructions stored in memory. Through execution of the instructions, a graphical image of a venue map is displayed and that includes graphics that are not to scale. The map includes latitude and longitude information associated with multiple points on the map. Visual updates of the user are provided on the map and personalized messages are delivered to the user.

DETAILED DESCRIPTION

The present invention includes a live dynamic map that provides for increased convenience for a user at a venue. Mobile and web-based clients allow application users to experience the live dynamic map. The live dynamic map may be branded for a venue, show points of interest and paths between locations, include a messaging capability, and allow users to be social with one another as well as venue management. The live dynamic map is a tool that may provide live analytics, assist with monetization, and is personalized for each user.

Live branded mapping may allow for similar engagement on a region-by-region, neighborhood-by-neighborhood, or even brand-by-brand basis. For example, a live branded mapping platform could be implemented not only in a theme park, but on a university campus. The platform could likewise be implemented in the context of a neighbor such as San Francisco's Mission District or San Diego's North Park neighborhood. By engaging on a hyper-local level (a small geographically defined community), the present mapping platform can better target user and payload delivering and improve upon business to consumer brand engagement.

Figure 1:
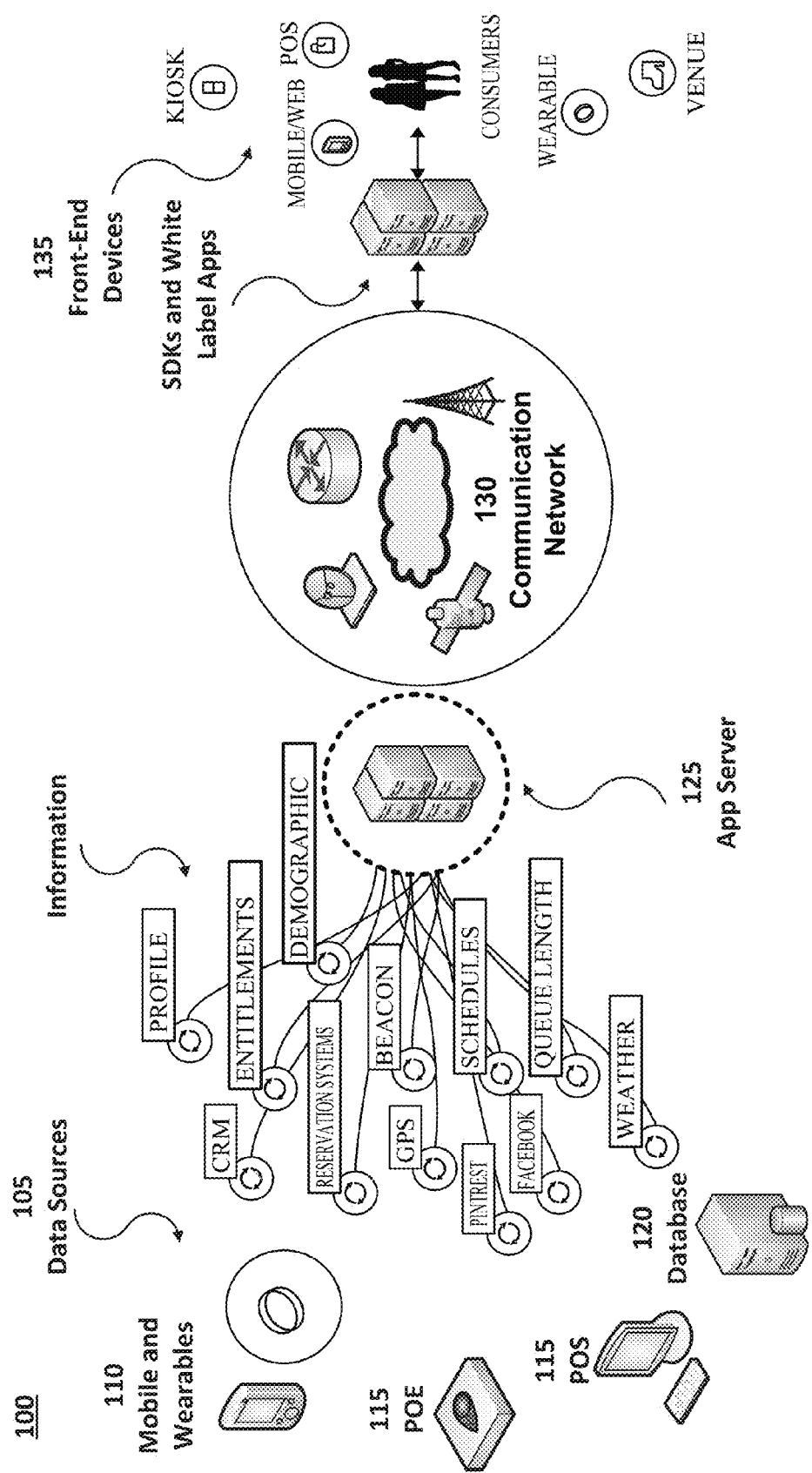
FIG. 1 illustrates a system for increasing customer engagement, including customer monetization, including live, dynamic mapping that utilizes branding, including hyper-local marketing.

FIG. 1 illustrates a system for increasing customer engagement, including customer monetization, including live, dynamic mapping that utilizes branding, including hyper-local marketing. The system 100 of FIG. 1 includes an ecosystem of data sources 105 such as mobile devices 110, point-of-sale (POS) or point-of-entry/-exit (POE) terminals 115, and databases 120. Communicatively coupled to data sources 105 are back-end application servers 125. In system 100, application servers 125 can ingest, normalize and process data collected from mobile devices 110 and various POS or POE terminals 115. Types of information gathered from data sources 105 and processed by back-end application servers 125 are generally inclusive of identity (e.g., user profiles, CRM data, entitlements, demographics, reservation systems and social media sources like Pintrest and Facebook), proximity (e.g., GPS and beacons), and time (e.g., schedules, weather, and queue length).

Mobile devices 110 can execute an application on a user mobile device that shares customer engagement data such as current and prior physical locale within a venue as well as wait times and travel times (e.g., how long was a customer at a particular point in a venue and how long did it take the customer to travel to a further point in a venue), paths to certain point on the map, and other information. Mobile devices 110 are inclusive of wearable devices. Wearable devices (or 'wearables') are any type of mobile electronic device that can be worn on the body or attached to or embedded in clothes and accessories of an individual. Processors and sensors associated with a wearable can gather, process, display, and transmit and receive information.

POS data may be gathered at a sales terminal 115 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be a local, proprietary network (e.g., an intranet) and/or may be a part of a larger wide-area network. Communication network 130 may include a variety of connected computing device that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a wide area network (WAN) such as the Internet operating through one or more network service provider.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The system 100 of FIG. 1 provides services to connect venue management with visitors and entertainment consumers while simultaneously providing a messaging platform for consumers. For example, the social network of a consumer may be extended into a map and the physical world associated with the map. Services to extend the social network of a user include finding friends, coordinating rally points, management of proximity based parental controls, serendipitous discovery, and customization and sharing of photos. Venue management may provision consumers with badges, points and rewards, coordinate scavenger hunts and competitions, and provide leaderboard and trivia services. Consumers may also be engaged by collecting feedback and reviews of their experiences, managing favorites and wish lists, conducting surveys and interactive voting, and through the display of messages.

Figure 2:
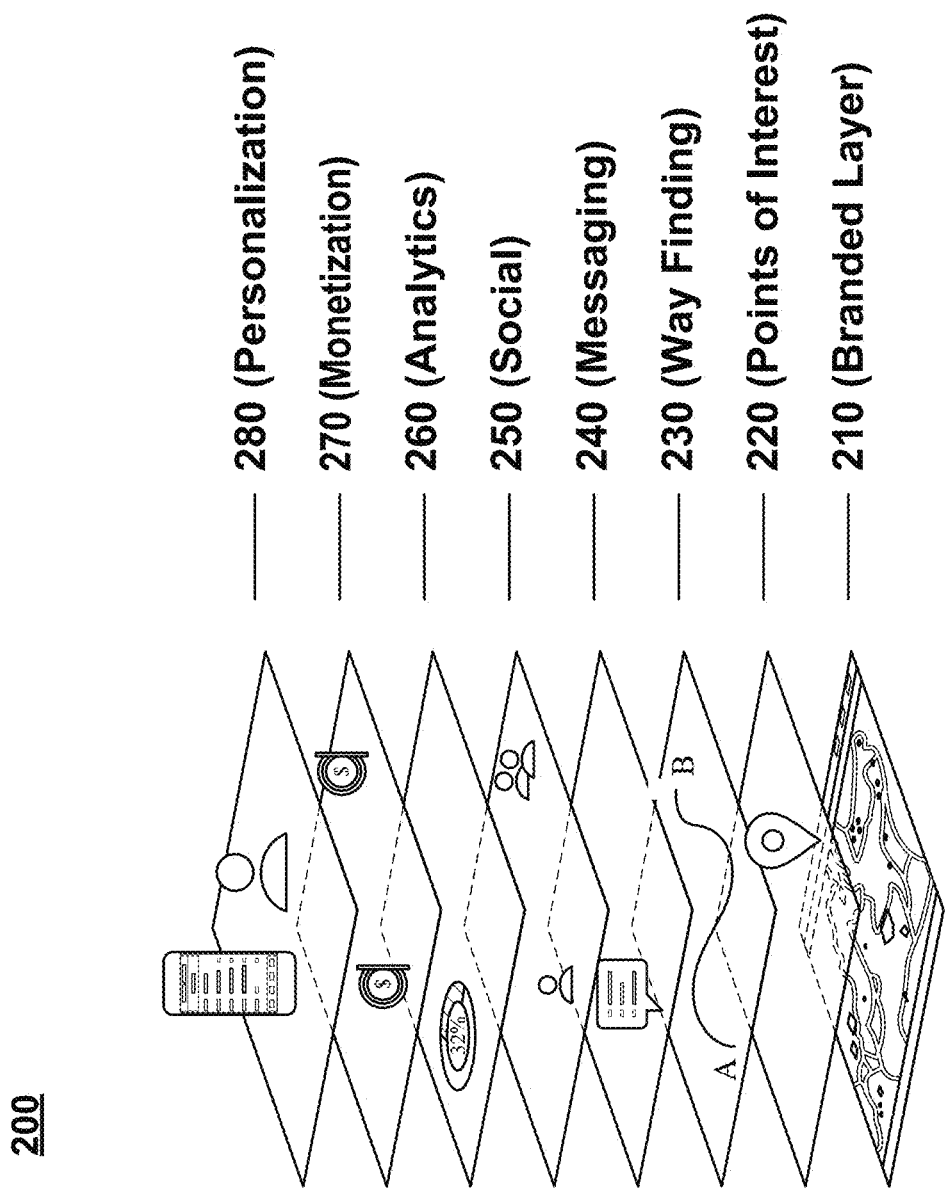
FIG. 2 illustrates a conceptual view of a live dynamic map.

FIG. 2 illustrates a conceptual view of a live dynamic map 200. A live branded map 200 like that shown in FIG. 2 may be presented to a user through a device such as a mobile device, tablet, wearable, or other device executing an application on the particular device. The application may communicate with one or more back-end application servers over a network as illustrated in the system 100 of FIG. 1.

The live dynamic map 200 of FIG. 2 includes conceptual layers of a branded layer 210, points of interest 220, way finding 230, messaging 240, social features 250, live analytics 260, monetization 270, and personalization 280.

The map is branded in the spirit of the venue, which may be hyper-local in nature such as a neighborhood or even brand-based. The branded base layer 210 of the map may be derived from a graphical map provided by the venue. For example, for a venue such as a theme park, the branded base layer 210 of the live branded map 200 may be an artistic map showing the park attractions that is typically provided to guests as they enter the theme park. Branded base layer 210 in a hyper-local initiative such as a neighborhood may illustrate a street or series of streets making up the neighborhood.

Such a map could be two-dimensional and show street information with corresponding information related to venues in that neighborhood. The branded base layer 210 could also be three-dimensional and illustrates physical features of the neighborhood and buildings located therein. Traffic flow information could likewise be illustrated for the neighborhood or area much in the same way that a venue like a theme park might illustrate wait times for rides or attractions. For example, a neighborhood-based base layer 210 could allow for literal traffic information for streets or wait times at various popular venues. This information may likewise be integrated with points of interest 220, way finding 230, and analytics 260 as described herein.

Live dynamic map 200 may also include points of interest 220. The points of interest may include any point on the map that may be of interest to a guest of the venue, such as ride, restaurant, bathroom, or other point. Information related to the point of interest 220 may be provided such as the nature of the point of interest, services or goods provided at the point of interest as well as hours, costs, reviews, specials and deals, or wait times. Specific brand related information may also be conveyed at a point of interest or as a point of interest in and of itself. Point of interest 220 data may be introduced either natively or through any third-party service operating in conjunction with or co-branding/sponsoring map 200.

In this regard, map 200 could be revised in real-time to reflect different sponsor or brand information. Such live updates would in turn affect various points of interest 220 that may be related to a particular brand and could even affect the underlying brand layer 210 as a whole. Sponsorship and hyper-local branding initiatives may likewise affect other layers of map 200 in real time or near-real time subject to updates and network connectivity.

Live branded map 200 may integrate a way finding component 230 to allow a user to see where on the map the user is currently located and how to get to other points on the map. These points may include points of interest identified in points of interest layer 220 and described above. Way finding may utilize various location based services as described in the context of FIG. 1.

The live dynamic map 200 may be mapped to the physical world using latitude and longitudinal matching with certain points in the map 200. Often times, the artistic map is not to scale, is disproportionate, and has differing scales at different parts of the map. Markers are used to set local rules regarding how longitude and latitude should map to a point on the artistic map of the venue. The markers may be placed at features and locations in the artistic map that have distortion in scale.

The rules associated with these markers will control how the map behaves in that area. For example, a particular rules may affect how the map 200 behaves with representing user movement within the map 200 at that location. The marker location and disposition affects rule complexity. The same marker/rule logic determines user location and path identification and location.

In some instances, the platform uses a position strategy to convert latitude and longitude location information into map x/y position information. The strategy can be different for maps of different venues. Additionally, one venue may have multiple maps, and one or more maps for a particular venue may have a different strategy than one or more other maps for that venue. One strategy utilizes a linear transformation to convert latitude and longitude location to map x/y position. The linear transformation uses a series of markers to establish the conversion rules for a particular map. Markers are fixed positions that map latitude and longitude location to x/y positions on the map.

The simplest linear transformation strategy may use the closest markers. For example, this may include use of the closest three markers. The latitude and longitude location of those marker locations may be calculated using conversion rules. The transformation rules may be managed using the following linear transformation:

$$X(1,2,3)=A*a+B*b+E,$$

$$Y(1,2,3)=C*a+D*b+F,$$

where a is the latitude and b is the longitude for any given location. The constants A-F are computed using the latitude, longitude and x, y values from markers 1, 2, and 3:

$$A=(b1*(x3-x2)+b2*(x1-x3)+b3*(x2-x1))/(a1*(b2-b3)+a2*(b3-b1)+a3*(b1-b2)),$$

$$B=(x2-x1+A*(a1-a2))/(b2-b1),$$

$$C=(b1*(y3-y2)+b2*(y1-y3)+b3*(y2-y1))/(a1*(b2-b3)+a2*(b3-b1)+a3*(b1-b2)),$$

$$D=(y2-y1+C*(a1-a2))/(b2-b1),$$

$$E=x1-A*a1-B*b1,$$

$$F=y1-C*a1-D*b1.$$

A more complex strategy may use information from the four closest markers, blending the x/y position computed the three closest markers 1, 2, 3 with the position computed using the two closest and next-closest marker 1, 2, 4, weighted by their relative distance from the target location:

$$X=X(1,2,3)*w3+X(1,2,4)*w4,$$

$$Y=Y(1,2,3)*w3+Y(1,2,4)*w4,$$

where w3 and w4 are the relative weightings for markers 1, 2, 3 and 1, 2, 4, respectively.

They are computed using d3 and d4, the distances to marker 3 and 4, respectively:

$$w3=1/d3/(1/d3+1/d4),$$

$$w4=1/d4/(1/d3+1/d4).$$

Another strategy uses a similar pattern, using information from the five closest markers:

$$X=X(1,2,3)*w3+X(1,2,4)*w4+X(1,2,5)*w5,$$

$$Y=Y(1,2,3)*w3+Y(1,2,4)*w4+Y(1,2,5)*w5,$$

where:

$$w3=1/d3/(1/d3+1/d4+1/d5),$$

$$w4=1/d4/(1/d3+1/d4+1/d5),$$

$$w5=1/d5/(1/d3+1/d4+1/d5).$$

In some instances, the way finding features may include providing a recommended path to a user between two points. The recommended path may be determined by up-to-date conditions of the venue, including crowds, obstacles, construction, and points of interest along the way.

The messaging feature 240 of the live branded map 200 may include perishable and visual communication features to communicate information about limited-time offers at various points of interest, which may correlate to user location, the occurrence of events at various locales within a venue or hyper-local market, or to allow user-to-user communication. The social capability of the live dynamic map may provide an overlaying social graph 250 onto the map. For example, the live branded map 200 may indicate to a user if any contacts from a third party networking service are present at the venue. The messaging may include serendipitous discovery in which contacts of the user through a third party service are shown as available at the venue, and interests of the user and present at the venue are communicated to the user. The messaging feature 240 may be integrated with the social graph 250 component to allow for contextual flash mob that occur when a certain condition is met, for example if fifty people gather at the event, by a particular time and at a particular location. Various offers and rewards may result from such occurrences.

The live dynamic map 200 of FIG. 2 may include live analytics 260 capabilities. The analytics may monitor user location within the venue, activity (seeing a show), movement and other parameters associated with the user. The analytics may be used to determine what promotions, marketing, offers, messages and other content is communicated to a user via the monetization layer 270 or through the likes of messaging features 240. Live analytics may also include or rely upon providing the location and status of hardware sensors placed within the venue or hyper-local market such as a neighborhood. Sensors presented on the map may include Bluetooth low-energy beacons, RFID/NFC readers, Wi-Fi access points, and other sensors utilized to collect data on user location, proximity, and access control.

The personalization layer 280 ensures that each live map is personalized for a particular user. The personalization layer 280 personalizes a live map 200 by pushing custom itineraries to each user, providing a "guide" to a user based on data collected about the user within the venue, and other information provided to the user based on data associated with the user.

Figure 3:
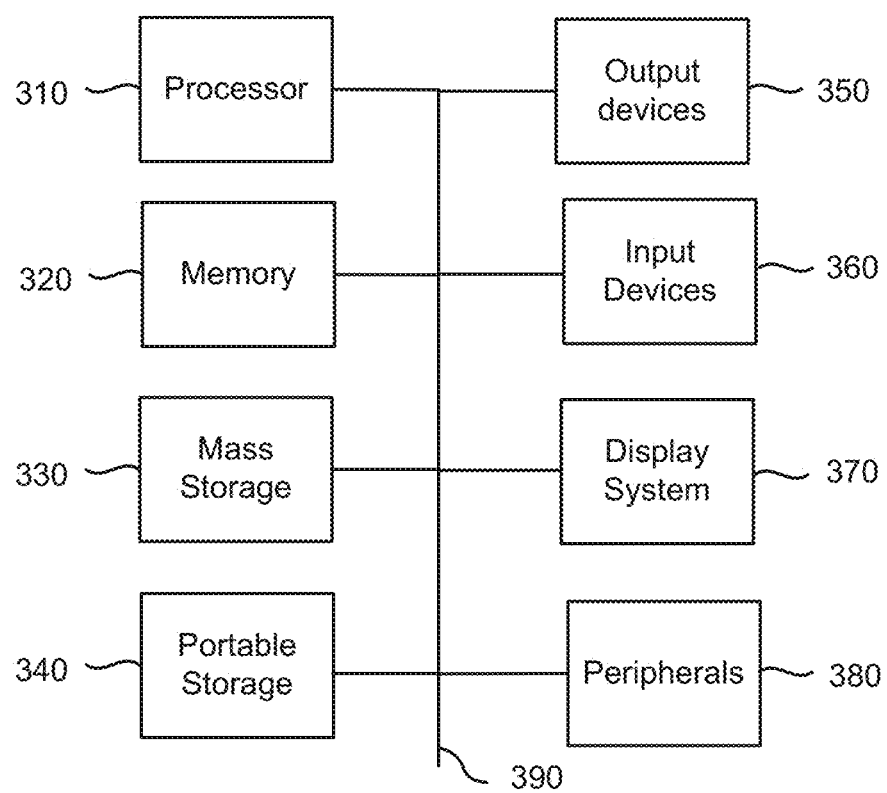
FIG. 3 illustrates an exemplary computing system that may be utilized to implement one or more embodiments of the present invention.

FIG. 3 illustrates an exemplary computing system that may be utilized to implement one or more embodiments of the present invention. System 300 of FIG. 3, or portions thereof, may be implemented in the likes of client computers, application servers, web servers, mobile devices, wearable devices, and other computing devices. The computing system 300 of FIG. 3 includes one or more processors 310 and main memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral device ports 380.

While the components shown in FIG. 3 are depicted as being connected via a single bus 390, they may be connected through one or more internal data transport means. For example, processor 310 and main memory 320 may be connected via a local microprocessor bus while mass storage device 330, peripheral device port(s) 380, portable storage device 340, and display system 370 may be connected via one or more input/output (I/O) buses.

Mass storage device 330, which could be implemented with a magnetic disk drive or an optical disk drive, is a non-volatile storage device for storing data and instructions for use by processor 310. Mass storage device 330 can store software for implementing embodiments of the present invention, including the live branded map described in the context of FIG. 2.

Portable storage medium drive(s) 340 operates in conjunction with a portable non-volatile storage medium such as a flash drive or portable hard drive to input and output data and corresponding executable code to system 300 of FIG. 3. Like mass storage device 330, software for implementing embodiments of the present invention (e.g., the live branded map of FIG. 2) may be stored on a portable medium and input to the system 300 via said portable storage.

Input devices 360 provide a portion of a user interface. Input devices 360 may include an alpha-numeric keypad, such as a keyboard, for inputting alpha-numeric and other information, or a pointing device, such as a mouse. Input device 360 may likewise encompass a touchscreen display, microphone, and other input devices including virtual reality (VR) components. System 300 likewise includes output devices 350, which may include speakers or ports for displays, or other monitor devices. Input devices 360 and output devices 350 may also include network interfaces that allow for access to cellular, Wi-Fi, Bluetooth, or other hard-wired networks.

Display system 370 may include a liquid crystal display (LCD), LED display, touch screen display, or other suitable display device. Display system 370 receives textual and graphical information, and processes the information for output to the display device. In some instances, display system 370 may be integrated with or a part of input device 360 and output device 350 (e.g., a touchscreen). Peripheral ports 380 may include any type of computer support device to add additional functionality to the computer system. For example, peripheral device(s) 380 may include a modem or a router or other network communications implementation (e.g., a MiFi hotspot device).

The components illustrated in FIG. 3 are those typically found in computer systems that may be suitable for use with embodiments of the present invention. In this regard, system 300 represents a broad category of such computer components that are well known in the art. System 300 of FIG. 3 can be a personal computer, hand held computing device, smart phone, tablet computer, mobile computing device, wearable, workstation, server, minicomputer, mainframe computer, or any other computing device.

System 300 can include different bus configurations, network platforms, processor configurations, and operating systems, including but not limited to Unix, Linux, Windows, iOS, Palm OS, and Android OS. System 300 may also include components such as antennas, microphones, cameras, position and location detecting devices, and other components typically found on mobile devices. An antenna may include one or more antennas for communicating wirelessly with another device. An antenna may be used, for example, to communicate wirelessly via Wi-Fi, Bluetooth, with a cellular network, or with other wireless protocols and systems. The one or more antennas may be controlled by a processor, which may include a controller, to transmit and receive wireless signals. For example, processor execute programs stored in memory to control antenna transmit a wireless signal to a cellular network and receive a wireless signal from a cellular network. A microphone may include one or more microphone devices which transmit captured acoustic signals to processor and memory. The acoustic signals may be processed to transmit over a network via antenna.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for displaying a venue map of a venue on a mobile device, the method comprising:
   identifying a location of the mobile device using at least a global positioning system (GPS) receiver integrated with the mobile device;
   generating the venue map, the venue map including:
      a plurality of distinct map portions, wherein a first map portion is represented at a first scale and a second map portion is represented at a second scale that is different from the first scale, the first map portion corresponding to the identified location of the mobile device, and
      at least one point of interest having known latitude and longitude coordinates that correspond to the second map portion;
   displaying the generated venue map on a display of the mobile device; and
   visually updating the venue map in response to changes in the location of the mobile device as the mobile device moves through the venue, wherein updates include changes in the scale of the venue map based on alterations to the first map portion and the second map portion, the alterations based on at least one conversion rule.

2. The method of claim 1, further comprising displaying a personalized message overlaid over the displayed generated venue map.

3. The method of claim 2, wherein the personalized message includes a suggested route, the suggested route determined based on dynamically updated congestions of people detected within the venue.

4. The method of claim 2, wherein the personalized message includes a suggested itinerary.

5. The method of claim 1, further comprising visually updating the venue map in response to changes of the known latitude and longitude coordinates of the at least one point of interest within the venue.

6. The method of claim 1, wherein the latitude and longitude coordinates of the at least one point of interest are received from one or more hardware sensors.

7. The method of claim 1, wherein the first map portion and the second map portion are generated based on the at least one conversion rule, wherein the at least one conversion rule converts latitude and longitude points to map points based on comparisons between the latitude and longitude points and a plurality of markers on the venue map with known latitude and longitude locations.

8. The method of claim 7, wherein the at least one conversion rule selects the plurality of markers that are closest to each latitude and longitude point.

9. The method of claim 7, wherein the one or more conversion rules assigns higher weights to comparisons with markers that are closer to each latitude and longitude point than to comparisons with markers that are further away from the latitude and longitude point.

10. A device for displaying a venue map of a venue, comprising:
- a global positioning system (GPS) receiver integrated with the device, the GPS receiving identifying a location of the device;
- a display integrated with the device;
- memory integrated with the device; and
- a processor coupled to the memory and the display and the GPS receiver, wherein execution of instructions stored in the memory by the processor:
  - generates the venue map, the venue map including:
    - a plurality of distinct map portions, wherein a first map portion is represented at a first scale and a second map portion is represented at a second scale that is different from the first scale, the first map portion corresponding to the identified location of the mobile device, and
    - at least one point of interest having known latitude and longitude coordinates that correspond to the second map portion,
  - displays the generated venue map on the display,
  - visually updates the venue map in response to changes in the location of the device as the device moves through the venue, wherein updates include changes in the scale of the venue map based on alterations to the first map portion and the second map portion, the alterations based on at least one conversion rule.

11. The device of claim 10, wherein execution of the instructions by the processor further displays a personalized message overlaid over the displayed generated venue map.

12. The device of claim 11, wherein the personalized message includes a suggested route, the suggested route determined based on dynamically updated congestions of people detected within the venue.

13. The device of claim 11, wherein the personalized message includes a suggested itinerary.

14. The device of claim 10, wherein execution of the instructions by the processor further visually updates the venue map in response to changes in latitude and longitude coordinates of the at least one point of interest.

15. The device of claim 10, wherein the latitude and longitude coordinates of the at least one point of interest are received from one or more hardware sensors.

16. The device of claim 10, wherein the first map portion and the second map portion are generated based on the at least one conversion rule, wherein the at least one conversion rule converts latitude and longitude points to map points based on comparisons between the latitude and longitude points and a plurality of markers on the venue map with known latitude and longitude locations.

17. The device of claim 16, wherein the at least one conversion rule selects the plurality of markers that are closest to each latitude and longitude point.

18. The device of claim 16, wherein the one or more conversion rules assigns higher weights to comparisons with markers that are closer to each latitude and longitude point than to comparisons with markers that are further away from the latitude and longitude point.

19. A non-transitory computer-readable storage medium, having embodied thereon a program executable by a processor to perform a method for displaying a venue map of a venue on a mobile device, the method comprising:
- identifying a location of the mobile device using at least a global positioning system (GPS) receiver integrated with the mobile device;
- generating the venue map, the venue map including:
  - a plurality of distinct map portions, wherein a first map portion is represented at a first scale and a second map portion is represented at a second scale that is different from the first scale, the first map portion corresponding to the identified location of the mobile device, and
  - at least one point of interest having known latitude and longitude coordinates that correspond to the second map portion;
- displaying the generated venue map on a display of the mobile device; and
- visually updating the venue map in response to changes in the location of the mobile device as the mobile device moves through the venue, wherein updates include changes in the scale of the venue map based on alterations to the first map portion and the second map portion, the alterations based on at least one conversion rule.

* * * * *